United States Patent
Zanker

(12) 
(10) Patent No.: US 6,533,065 B2
(45) Date of Patent: Mar. 18, 2003

(54) NOISE SILENCER AND METHOD FOR USE WITH AN ULTRASONIC METER

(75) Inventor: Klaus Joachim Zanker, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 09/740,427

(22) Filed: Dec. 19, 2000

(65) Prior Publication Data

US 2003/0034202 A1 Feb. 20, 2003

(51) Int. Cl.$^7$ ................................................ H01N 1/08
(52) U.S. Cl. ....................... 181/264; 181/267; 181/268; 73/861.18
(58) Field of Search ................................ 181/264, 267, 181/268, 269, 272, 274, 275, 279, 280, 252, 256, 258; 73/861.18

(56) References Cited

U.S. PATENT DOCUMENTS

| | | | | |
|---|---|---|---|---|
| 2,050,581 A | * | 8/1936 | Orem ........................... | 181/264 |
| 4,122,913 A | * | 10/1978 | Stemp ........................... | 181/264 |
| 4,685,534 A | * | 8/1987 | Burstein et al. ............. | 181/272 |
| 5,962,821 A | * | 10/1999 | Iannrtti ........................ | 181/256 |
| 6,189,389 B1 | * | 2/2001 | Van Bekkum et al. ... | 73/861.18 |

FOREIGN PATENT DOCUMENTS

| | | |
|---|---|---|
| FR | 2 737 564 | 2/1997 |
| WO | WO97/31365 | 2/1997 |
| WO | WO99/22207 | 5/1999 |

* cited by examiner

*Primary Examiner*—Khanh Dang
(74) *Attorney, Agent, or Firm*—Conley Rose, P.C.

(57) ABSTRACT

A silencer for use with ultrasonic meters to reduce stray ultrasonic noise that could cause measurement inaccuracies. The silencer comprises a tubular body having at least two baffles spaced apart from one another. The baffles are preferably formed of an open-cell, reticulated metal foam material that absorbs noise in the ultrasonic range of frequencies under high-pressure operating conditions. The silencer is a reasonable flow conditioner and can be mounted directly to the meter without disturbing the flow.

The silencer reduces the level of ultrasonic stray noise by absorption. Ultrasonic noise waves are partially reflected between the baffles and along their length as the waves move between baffles. With each reflection, the baffle material absorbs energy that is lost by friction in the pores of the foam material. Through this process of the ultrasonic waves being reflected and the noise being incrementally absorbed, the energy of the ultrasonic wave is attenuated.

31 Claims, 5 Drawing Sheets

NOISE SILENCER AND METHOD FOR USE WITH AN ULTRASONIC METER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to a silencer and method for use with an ultrasonic meter that reduces noise in the ultrasonic range of frequencies generated by other equipment in the flow stream. More particularly, the invention relates to a silencer and method for use with an ultrasonic meter that is capable of reducing ultrasonic noise under high-pressure operating conditions. Still more particularly, the invention relates to a silencer and method for use with an ultrasonic meter that also acts as a reasonable flow conditioner.

2. Background of the Invention

In pipeline operations and other industrial applications, meters must be capable of accurately measuring the flow rate of gases or liquids moving through piping or tubing systems. In natural gas pipelines, for example, these flow rate measurements may be relied upon for custody transfer, leak detection, control, or for other indications.

For custody transfer operations, the meter is the point where custody transfer occurs, such as when gas is delivered into or out of a pipeline system through the meter as it measures the passing flow rate. By accurately measuring the flow rate for a given time period, the volume of gas that passes through the meter can be determined, and a custody transfer volume ticket can then be prepared. The pipeline transportation fee is based on the volume of product moved through the system, i.e. the custody transfer volume. Thus, a custody transfer metering system is commonly referred to in the pipeline industry as the "cash register," and pipeline operators take great care to maintain its measurement accuracy.

Measurement systems comprising two or more meters may perform a pipeline leak detection function. A pipeline typically operates in a "packed" or full-line condition. Therefore, as gas is pumped into the system through the inlet meter, gas is simultaneously delivered out of the system through the outlet meter, and the measurements taken at each meter are compared. This "meter-in, meter-out" approach provides two modes of leak detection. First, the flow rate measured by the inlet meter should match the flow rate measured by the outlet meter within a certain accuracy tolerance, taking into account characteristics that may cause flow rate deviations, such as elevation differences or product temperature variations. Second, by measuring flow rate over a given time period, the volume moved through each meter can be determined, and the inlet and outlet meter volume measurements should correlate over that time period. A measurement discrepancy could indicate a pipeline leak, although the storage of gas in the pipeline (line packing) makes short-term leak measurements difficult. Nonetheless, early leak detection enables a pipeline operator to locate and repair the problem more quickly, thereby minimizing the environmental and public safety impacts of a leak. Thus, accurate metering systems are necessary for profitable, safe, and reliable pipeline system operations and other industrial applications.

Flow meters are available in many different forms. Most conventional meters, such as turbine meters, are inserted directly into the flow stream where the gas drives a rotor mounted within a meter housing. The meter measures the number of rotations per unit time, which is proportional to the gas flow rate. These meters are fairly expensive and require regular calibrations to maintain accuracy over a long time period. They are also intrusive to the flow stream and include moving parts with close internal tolerances that are susceptible to damage from gas flow stream contaminants.

The ultrasonic meter is often a preferable metering device in gas flow streams because it overcomes the problems of conventional in-line meters by measuring flow rate in a non-invasive fashion, with considerable accuracy, and with no moving parts. An ultrasonic meter includes two or more transducers that emit ultrasonic waves into the flow stream and measure the propagation time of each wave to determine the flow rate of the passing gas stream. An ultrasonic wave is a sound wave having a frequency above the audible sound range, and more particularly, having a frequency >20 kHz. A typical ultrasonic meter emits ultrasonic waves at frequencies between 50 kHz and 300 kHz, and preferably between 80 kHz and 180 kHz. U.S. Pat. No. 4,646,575 (hereby incorporated herein by reference for all purposes) discloses an ultrasonic meter and many of its features.

An ultrasonic measurement system may include a silencer placed between the meter and other equipment in the measurement flow stream. The silencer reduces stray ultrasonic noise that interferes with the accuracy of the ultrasonic meter. Such stray ultrasonic noise is commonly produced during gas distribution where the gas pressure is dropped precipitously and generates substantial noise (i.e. enough to interfere with measurements). A pressure-regulating valve that reduces the pressure of multiple incoming flow streams as the gas is combined into a common supply pipeline, or reduces the pressure from a main supply grid to local distribution, is another source of ultrasonic noise. Environmental regulations set upper limits on the acoustic noise level that industrial equipment can emit. To avoid excess acoustic noise, a pressure-regulating valve may be designed, for example, to reduce gas pressure by variably restricting small holes drilled into a rigid steel plate to reduce, as far as possible, the emission of sound waves in the acoustic range of frequencies. However, because the gas flow approaches supersonic velocity as it moves through these drilled holes, the pressure regulating valve instead generates high levels of broad band ultrasonic noise. This ultrasonic noise propagates through the gas to interfere with the ultrasonic flow meter signals, resulting in a poor signal to noise ratio and a loss of measurement accuracy.

Silencers are designed to attenuate the wave energy of stray ultrasonic noise by reflection, absorption or both. PCT Application WO 97/31365 (the contents of which are hereby incorporated herein by reference for all purposes) discloses one type of ultrasonic silencer that uses a diffuser arrangement, such as a perforated tubular body, with a multiplicity of small-area surfaces that frequently reflect the ultrasonic waves. These reflections result in destructive interference between the acoustic paths, thereby effectively damping the ultrasonic noise. The noise is attenuated by scattering the ultrasonic energy from the wave and reflecting it in many different directions. The diffuser surfaces of the silencer are preferably at least partially curved, leading to the formation of vortices inside the gas flow that likewise cause acoustic path interference to reduce the ultrasonic noise. These gas vortices can introduce undesirable flow disturbances into the measurement path, thus requiring the silencer to be located a minimum distance away from the meter. This distance requirement may be undesirable when space is limited.

A second type of silencer relies on absorption to attenuate stray ultrasonic noise. This silencer is a foam plug, formed of an open-cell material that is inserted into the flow stream for the gas to pass through before entering the measurement flow path. The foam plug attenuates noise by converting the ultrasonic energy into thermal energy through friction loss in the interstices of the material. Although this is an effective ultrasonic silencer, high-pressure loss is observed as the gas flows through the foam plug. Furthermore, the foam plug acts to filter dirt and absorb liquids in the flow stream. Thus, the open-cell foam plug silencer is only suitable for use in clean gas service and in systems that can accommodate high pressure loss through the silencer.

French Publication No. 2,737,564 (the contents of which are hereby incorporated herein by reference for all purposes) discloses another type of silencer that relies on both absorption and reflection to attenuate stray ultrasonic noise. This type of silencer includes a chamber with walls formed of a closed-cell, visco-elastic, absorbing material that is porous, such as, for example, a polyurethane foam, with a pore size chosen to absorb the unwanted ultrasonic waves at a particular frequency to achieve the desired attenuating effect. The absorbing material may be flexible or rigid. When ultrasonic waves enter the chamber, they are partially reflected off the absorbent material of the walls to attenuate the amplitude of these waves. To increase the attenuating effect of reflection, the silencer may include projecting walls that form passages to trap the ultrasonic waves, forcing multiple reflections and energy loss (by absorption) upon each reflection. Another way to attenuate the ultrasonic waves by reflection is to place an obstacle, formed of either absorbing or reflecting material, internally of the chamber between the inlet and outlet of the meter. The obstacle splits the flow stream and forces the waves to be reflected many times as the waves move between the chamber inlet and outlet. Silencers of this type are effective for use with ultrasonic flow meters operating at essentially atmospheric pressures of approximately 1 bar. However, a closed cell, visco-elastic foam exhibits an acoustic performance that decreases with increasing pressure. Namely, these closed-cell foam materials do not perform well at high pressures (up to 400 bar) because they tend to compress, thereby reducing the thickness and void fraction of the material to significantly reduce the sound absorbing quality of the foam.

Thus, to overcome deficiencies associated with prior silencers, it would be desirable for an ultrasonic silencer to be comprised of an absorbing material capable of maintaining its absorbing characteristics under high pressure operating conditions up to 400 bar. Further, it would be advantageous to have an ultrasonic silencer configured to introduce only a low pressure drop to the system. Additionally, it would be desirable to have an ultrasonic silencer that is suitable for use in either clean or contaminated gas service. It would also be desirable to have an ultrasonic silencer that introduces no flow disturbances, such as vortices, into the measurement path, but rather acts as a reasonable flow conditioner, thereby allowing the silencer to be bolted directly to the meter to minimize equipment space requirements.

SUMMARY OF THE INVENTION

The present invention features a silencer for use with an ultrasonic meter to reduce ultrasonic noise that would otherwise interfere with the meter and cause measurement inaccuracies. For effective use, the silencer should be mounted between the noise source and the ultrasonic meter. Thus, depending upon the location of the noise source, it may be mounted either upstream or downstream of the meter. When located upstream of the meter, it also acts as a reasonable flow conditioner. It therefore can be mounted directly to the meter in either an upstream or downstream position without introducing flow disturbances into the measurement flow path.

The silencer comprises a tubular body having at least two partitioning members or baffles internally disposed therein, with the width of each baffle disposed perpendicular to the flow and the length of each baffle disposed parallel to the flow. The baffles are formed of an open-cell material designed to absorb noise in the ultrasonic range of frequencies under high-pressure operating conditions, and even more preferably the baffles are formed of a reticulated metal foam. The baffles are flat plate members, or in another embodiment, concentric cylindrical members, or in yet another embodiment, corrugated plate members, spaced apart one from another to partition the flow area into discrete passageways. As ultrasonic noise waves enter the silencer, the waves propagate through the flow passageways and reflect between the baffles. With each reflection, the a small quantity of ultrasonic wave energy is absorbed by the baffle material, thereby attenuating the ultrasonic noise level.

Thus, embodiments of the present invention comprise a combination of features and advantages that enable it to overcome various problems of prior silencers. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
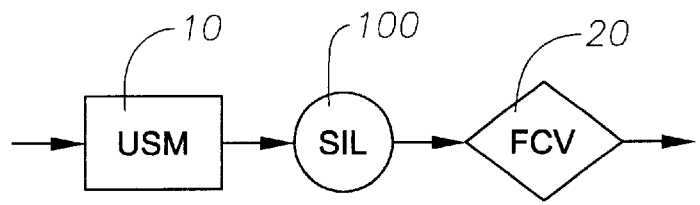
FIG. 1 is a schematic illustration of an ultrasonic flow meter placed upstream of a pressure-regulating valve with the silencer of the present invention placed therebetween.
Figure 2:
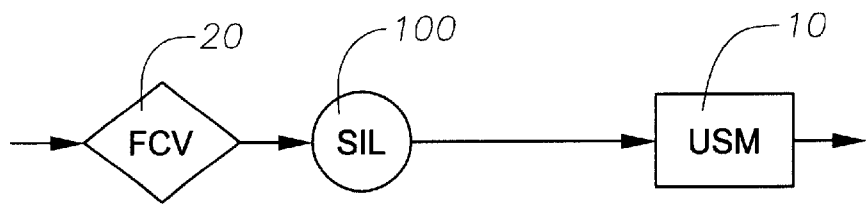
FIG. 2 is a schematic illustration of an ultrasonic flow meter placed downstream of a pressure-regulating valve with the silencer of the present invention placed therebetween.

FIGS. 1 through 4 show relative arrangements of an ultrasonic meter (USM) 10, a pressure-regulating or flow-control valve (FCV) 20, and a silencer (SIL) 100. In FIGS. 1 through 4, the arrows represent flow through a pipe with the arrowheads pointing toward the direction of flow. For reference purposes, the term "upstream" will be used to indicate a position away from the direction of flow, and the term "downstream" will be used to indicate a position toward the direction of flow. For example, in FIG. 1 the ultrasonic meter 10 is positioned upstream of the silencer 100, and the flow-control valve 20 is positioned downstream of the silencer 100. In FIG. 2, the meter 10 is positioned downstream of the silencer 100, and the valve 20 is positioned upstream of the silencer 100.

FIG. 1 and FIG. 2 schematically depict the preferred location of a silencer 100 within a straight section of pipe relative to an ultrasonic meter 10 and equipment that generates stray ultrasonic noise, such as, for example, a pressure-regulating valve or flow-control valve 20. The silencer 100 preferably is positioned between the ultrasonic meter 10 and the flow-control valve 20 to reduce the level of stray ultrasonic noise that the valve 20 generates as it opens and closes. In this way, the silencer 100 prevents the ultrasonic noise from interfering with the ultrasonic signals of the meter 10. Without the silencer 100, such interference could significantly impact measurement accuracy.

Referring now to FIG. 1, as the gas moves through the pipe, its flow rate is measured at the meter 10 before it enters the silencer 100. In this arrangement, there is no minimum distance required between the silencer 100 and the meter 10 because any flow disturbances that the silencer 100 might introduce will not affect the flow rate measurement that has already occurred at the meter 10. However, when the silencer 100 is positioned upstream of the meter 10, as shown in FIG. 2, conventionally a certain minimum distance has been required between the silencer 100 and the meter 10 because any flow disturbances introduced by the silencer 100 can negatively affect the flow rate measurements of the ultrasonic meter. The necessary minimum distance between the silencer 100 and the meter 10 is dictated by industry measurement standards. However, in contrast to prior art silencers, the silencer 100 of the present invention has experimentally been shown to act as a reasonable flow conditioner, thereby smoothing out the flow instead of introducing flow disturbances. Thus, the silencer 100 of the present invention may be positioned at any point along the pipe section between the flow-control valve 20 and the ultrasonic meter 10, including directly adjacent the meter 10. Eliminating the conventional minimum separation distance between the silencer 100 and the meter 10 is especially advantageous where space is limited, such as in offshore installations.

Figure 3:
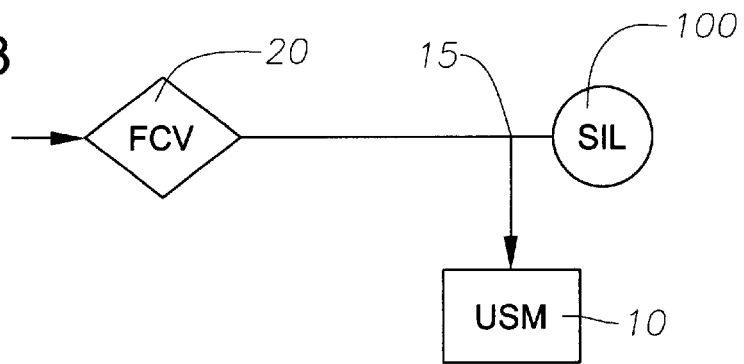
FIG. 3 is a schematic illustration of an ultrasonic flow meter placed downstream of a pressure-regulating valve, and at an angle to the valve, with the silencer of the present invention placed at a blind-T location therebetween.
Figure 4:
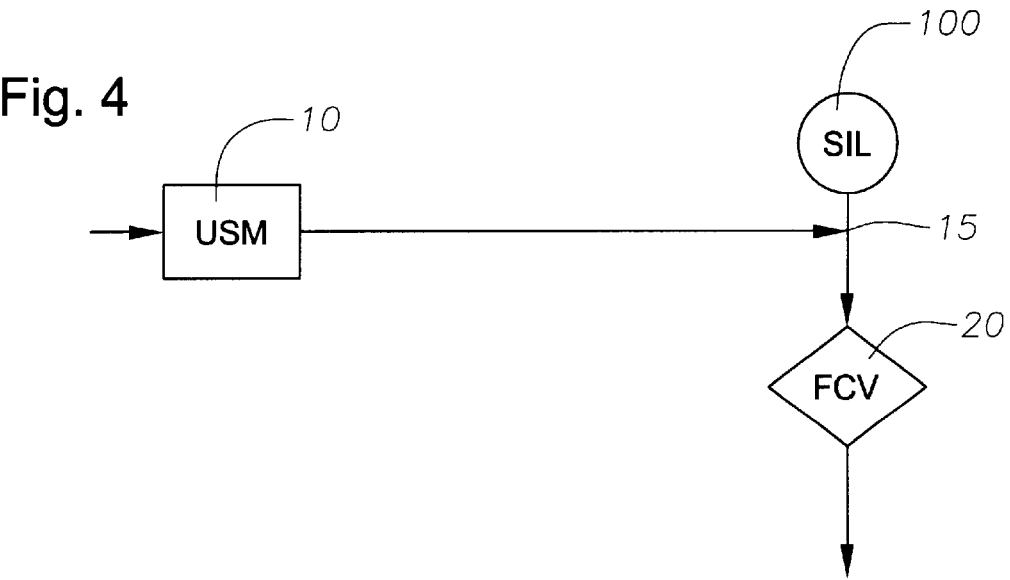
FIG. 4 is a schematic illustration of an ultrasonic flow meter placed upstream of a pressure-regulating valve, and at an angle to the valve, with the silencer of the present invention placed at a blind-T location therebetween.

FIG. 3 and FIG. 4 schematically depict the preferred position of a silencer 100 relative to an ultrasonic meter 10 and a flow-control valve 20 that are separated by an angle, such as, for example, a 90-degree angle. FIG. 3 shows the relative positions when the flow-control valve 20 is upstream of the meter 10, and FIG. 4 shows the relative positions when the flow-control valve 20 is downstream of the meter 10. The silencer 100 should again be located between the meter 10 and the valve 20, and in a linear relationship with the valve 20, so that the ultrasonic noise waves emanating from the valve 20 will impinge on the silencer 100. In this arrangement, the silencer is typically mounted at a blind-T location, and the entrance to the silencer is physically positioned at the corner 15 where the pipe changes direction to make the angle.

Figure 5:
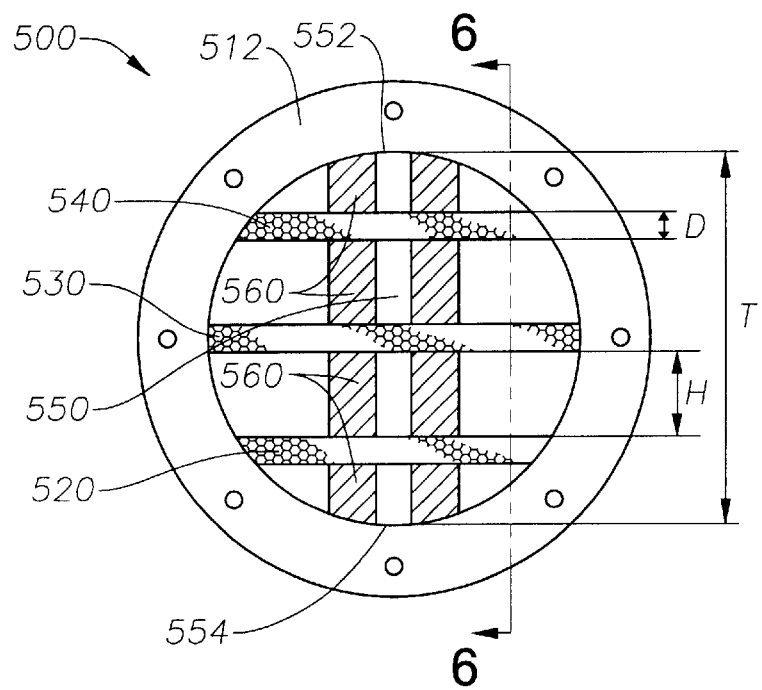
FIG. 5 is an end view of a silencer according to one embodiment of the present invention, incorporating a plurality of parallel, flat plate partitioning members or baffles having open spaces or passageways therebetween.
Figure 6:
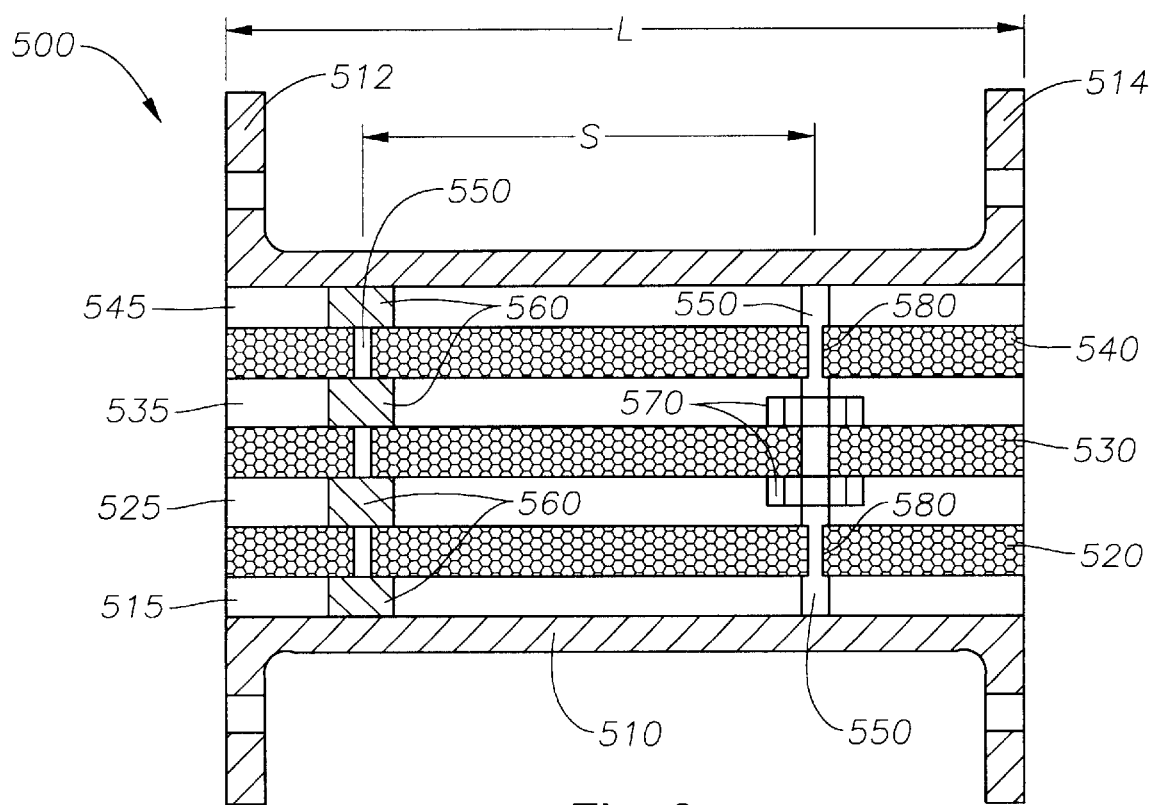
FIG. 6 is a cross-sectional view of the silencer illustrated in FIG. 5 taken along the section line 6—6.

FIG. 5 and FIG. 6 depict one embodiment of the silencer 500 of the present invention. FIG. 5 is a representative end view of the silencer 500, and FIG. 6 is a cross-sectional view of the silencer 500 taken along section line 6—6 of FIG. 5. The silencer 500 includes a tubular body 510, a plurality of flat, plate partitioning members or baffles 520, 530, 540 forming flow spaces or passageways 515, 525, 535, 545 therebetween, and at least one support fixture 550.

The diameter T of the tubular body 510 is commonly sized to match the diameter of the pipe section within which the silencer 500 is disposed. However, the diameter T of the tubular body 510 may be larger or smaller than the surrounding pipe section, depending upon the particular installation. The tubular body 510 may have flanged ends 512, 514 for a bolted connection to flanges mounted on the pipe section, or the ends 512, 514 may be tapered for welding into the pipe section, or threaded for threaded connection, or the ends 512, 514 may have any other suitable configuration for connecting to the pipe.

The silencer 500 includes at least two internal partitioning members or baffles, such as the three baffles 520, 530, 540 depicted in FIGS. 5 and 6. Of course, many more baffles may be included depending on design criteria, such as baffle width and the spacing between the baffles as explained below. Baffles 520, 530, 540 are formed of an open-cell material designed to absorb ultrasonic noise and withstand high flow rates and high pressure operating conditions up to approximately 400 bar. Baffles 520, 530, 540 may be made from an open-cell, visco-elastic material, but it is particularly preferred that they be made from a reticulated metal foam material, and more preferably Retimet® metal foam, manufactured by Dunlop Limited Aviation Division. If high pressures will not be encountered, the baffles may be made from a closed-cell material, but the disclosed silencers have been particularly designed to withstand high pressure environments, and thus the closed-cell materials are not preferred. The baffles 520, 530, 540 are generally the same size, each having a width D and a length L, and they are spaced apart to partition the flow area into discrete flow spaces or passageways 515, 525, 535, 545 through which the gas flows between the baffles 520, 530, 540. The flow spaces 515, 525, 535, 545 are generally the same size, each having a gap dimension H. The quantity of baffles, the width D, the length L, and the gap between baffles H are all determined based on the pipe size, flow conditions, and the level of ultrasonic noise reduction required. As shown, the length L of the baffles is typically the same as the tubular body 510, but this is not necessary to the invention.

At least one support fixture 550 is provided, and more than one may be provided at interval S along the length L of the silencer 500 (i.e. baffles 520, 530, 540). The support fixture 550 connects between and maintains the position of the baffles 520, 530, 540 within tubular body 510 such that flow spaces 515, 525, 535, 545 are provided, each having gap dimension H. The support fixture 550 may connect spacing blocks 560 between the baffles 520, 530, 540 to maintain the gap H, or washers 570 may be provided to position the baffles 520, 530, 540 along the support fixture 550, or alternatively the support fixture 550 may include notches 580 to position the baffles 520, 530, 540 along its length. The support fixture 550 may be a bolt, a section of metal, or any structure that is sufficiently rigid to withstand high pressure and high flow rate operating conditions. At interval S, a single support fixture 550 may pass radially at any angle through the tubular body 510 and baffles 520, 530, 540, such as top-to-bottom through the centerline as shown in FIG. 5. Alternatively, more than one support fixture 550 may be provided at interval S. The quantity of support fixtures 550, the radial angle of the support fixtures 550 with respect to the tubular body 510, and the interval S are adjustable based on the flow conditions. The support fixture 550 connects, such as by threads or by welding, to the tubular body 510 at 552, 554. The purpose of support fixture 550 is to lend support and stability to the baffles so that they maintain their position and spacing. Support fixture 550 may also help the baffles keep their shape and integrity in high velocity gas flows.

In operation, the silencer 500 attenuates the level of ultrasonic stray noise by absorption. When the gas flow enters the silencer 500, the ultrasonic noise waves move in the flow spaces 515, 525, 535, 545, reflecting between the baffles 520, 530, 540 and along their length L. The configuration of the baffles 520, 530, 540 encourages a multiplicity of reflections, and with each reflection, the material that forms the baffles 520, 530, 540 absorbs a small amount of energy that is lost by friction in the pores or interstices of the foam material. The noise absorbing capacity of a foam material is based on whether the material is impedance-matched with the gas. The acoustic impedance Z of a material is defined as:

$$Z = \rho \times c$$

where $\rho$=density of the material, and c=speed of sound through the material. The same impedance formula applies for determining the acoustic impedance of the gas, and the ideal absorbing material would have an impedance Z that equals the impedance of the gas. However, the density of a gas, and therefore the gas impedance, changes proportionately with pressure. Thus, the absorbing quality of the material forming the baffles 520, 530, 540 fluctuates as the operating pressure fluctuates, which is why numerous reflections are required to attenuate the ultrasonic noise level since only a small amount of absorption occurs with each reflection.

Additionally, the open-cell nature of the reticulated metal foam material forming the baffles 520, 530, 540 makes the silencer 500 suitable for use in high pressure operating conditions. The pore spaces within the material allow pressure internally of the baffles 520, 530, 540 to equalize with the external pressure. Therefore, the material forming the baffles 520, 530, 540 maintains its absorbing capability and does not tend to crush under high pressures.

The design and performance of the silencer 500 is based on selecting the diameter T of the tubular body 510, the grade of reticulated metal foam material that forms the baffles 520, 530, 540, the width D and the length L of the baffles 520, 530, 540, and the gap dimension H of the flow spaces 515, 525, 535, 545. To determine these parameters, the flow rate, pressure drop, contaminants in the flow stream, and the required ultrasonic noise reduction are all considered, and a compromise is made to determine the best combination of variables for the given application.

Typically the diameter T of the tubular body 510 is selected to match the diameter of the pipe, and the diameter of the pipe is determined based on the anticipated high flow rate of the gas in the system. For example, given an expected high gas flow rate, the pipe diameter may be sized to provide a flow velocity of 20 meters per second, and the diameter T of the tubular body 510 will typically be sized to match the pipe.

The ultrasonic noise wavelength $\lambda$ and the contaminants in the gas flow stream are the primary considerations when selecting the reticulated metal foam material forming the baffles 520, 530, 540. First, assume the ultrasonic noise that the silencer 500 is designed to reduce in a natural gas flowstream ranges from f=80 kHz to f=180 kHz, with f=130 kHz being the average. Next, given that the natural gas speed of sound c≈400 meters per second, the wavelength $\lambda$ of the ultrasonic noise is given by:

$$\lambda = c/f = 400 \text{ meters per second}/80 \text{ kHz} = 5 \text{ millimeters (mm)}$$

$$\lambda = c/f = 400 \text{ meters per second}/180 \text{ kHz} = 2.2 \text{ millimeters (mm)}$$

$$\lambda = 2.2 \text{ mm to } 5 \text{ mm}$$

When selecting Retimet® as the baffle material, it is commercially available in porosity grades 10, 20, 45, and 80, where the grade levels correspond to the approximate number of pores per inch of foam material (1 inch=25.4 mm). The grade with the highest quantity of pores per inch, i.e. grade 80, will provide the greatest noise reduction because when the pores are small relative to the wavelength of the ultrasonic noise, the baffles 520, 530, 540 will absorb a greater amount of energy by friction with each reflection. However, liquid or solid contaminants in the gas flow stream will tend to fill and clog the pores in the metal foam material, thereby reducing its effectiveness. When the pores are more densely packed (and therefore smaller), the clogging will occur relatively quicker than when the pores are larger to allow larger particles to pass through them. It is preferable, therefore, to compromise between selecting the most efficient sound absorbing grade and selecting the grade of Retimet® that is least likely to be clogged by flow stream contaminants. A reasonable compromise is to select a grade with pores having a diameter ranging from 10% to 20% of the ultrasonic noise wavelength. For example, Retimet® grade 45, having a pore diameter=0.56 mm, is a reasonable grade selection when the ultrasonic noise wavelength ranges from $\lambda$=2.2 mm to 5 mm.

When selecting the width D for baffles 520, 530, 540 and the gap H for flow spaces 515, 525, 535, 545, the first consideration is how "open" the silencer 500 should be to prevent self-generated noise in the acoustic range of wavelengths, i.e. to comply with environmental regulations and/or worker safety regulations, the silencer must not generate significant noise during operation. To avoid noise, it is generally recommended that the Mach number M be kept below M=0.1, where M is defined as:

$$M = \text{flow velocity } v/\text{speed of sound } c$$

To determine the baffle configuration, assume the maximum gas flow velocity through a fully open pipe is 20 meters per second, and given that c≈400 meters per second for natural gas, then $$M = v/c = 20 \text{ meters per second}/400 \text{ meters per second} = 0.05$$

If the silencer 500 is only half open to flow, i.e. the baffle width D equals the gap H, then the velocity through the silencer 500 doubles such that v=40 meters per second, making M=0.1. Alternatively, the velocity of the gas flow may be reduced by use of a tubular body 510 with a larger diameter T than the pipeline diameter. However, this may affect the flow conditioning performance of the design.

Where the body diameter T is not enlarged with respect to the pipeline diameter, to prevent the silencer 500 from generating self-noise in the acoustic range of frequencies, the gap H should be larger than the width D. Another way to state the same principle is:

$$H/D>1, \text{ or the porosity through the silencer}>50\%$$

The next consideration in determining the dimensions for the width D and the gap H is the wavelength $\lambda$ of the noise to be attenuated. To be effective in reducing the noise level, the baffle width D must be wide enough to be "visible" to the ultrasonic noise wave, i.e. to be an obstacle to its path. If the baffle width D is too narrow, the wave will simply pass through it and will not be reflected. Therefore, D should be dimensioned to be at least one wavelength $\lambda$.

The gap H must be sized to ensure that the wave will be reflected between baffles 520, 530, 540 as it propagates through flow spaces 515, 525, 535, 545. If H is too wide, the noise wave will merely move through flow spaces 515, 525, 535, 545 without being reflected between baffles 520, 530, 540. Therefore, H should be approximately equal to one wavelength $\lambda$. However, recall that H/D>1 to prevent self-noise. Therefore, it is preferable for D=approximately one wavelength $\lambda$, and H=slightly greater than one wavelength $\lambda$, such as 15% to 50% greater than one wavelength $\lambda$. The dB reduction of amplitude is directly proportional to the length of the baffles.

It is believed that a 40 dB reduction in ultrasonic noise levels (i.e. 99% reduction in amplitude) will be achieved by following these guidelines and having a length L for the baffles of 100 $\lambda$ to 200 $\lambda$. For an ultrasonic frequency of about 130 kHz, a length of 600 mm will ensure a noise reduction of 40 dB. A length of about 200 mm (i.e. from 100 mm to 300 mm) is generally preferred.

Figure 7:
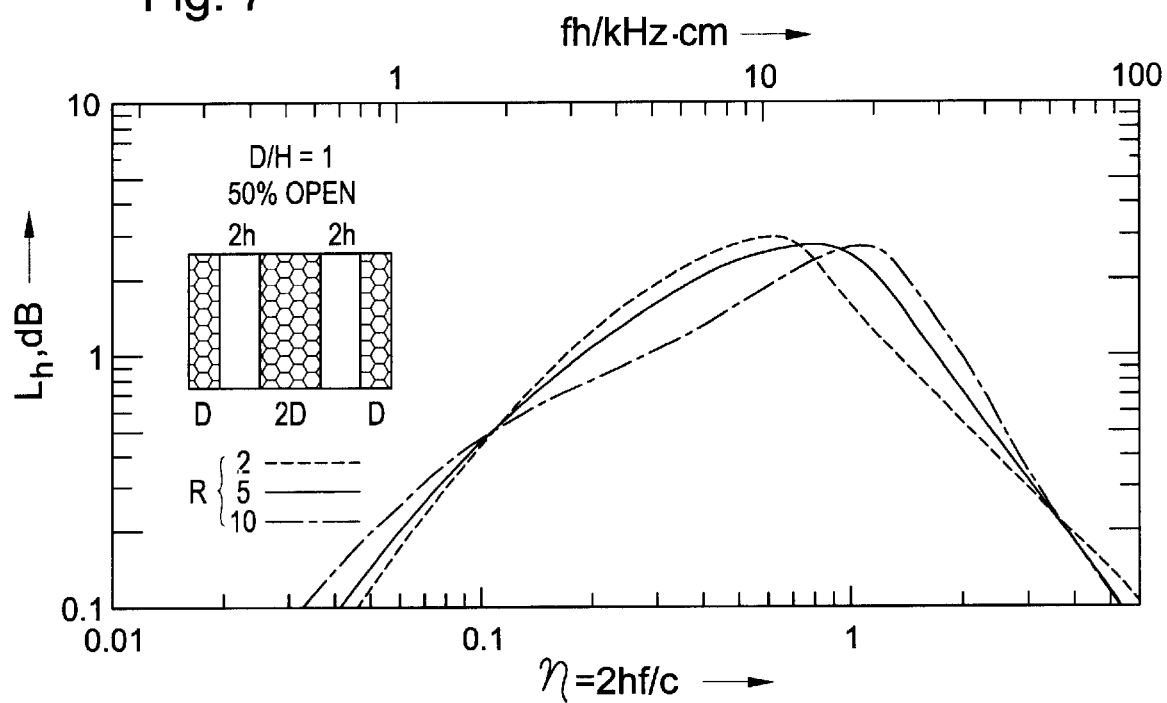
FIG. 7 is a graph used for designing various silencer dimensions, assuming the silencer has a 50% open configuration.
Figure 8:
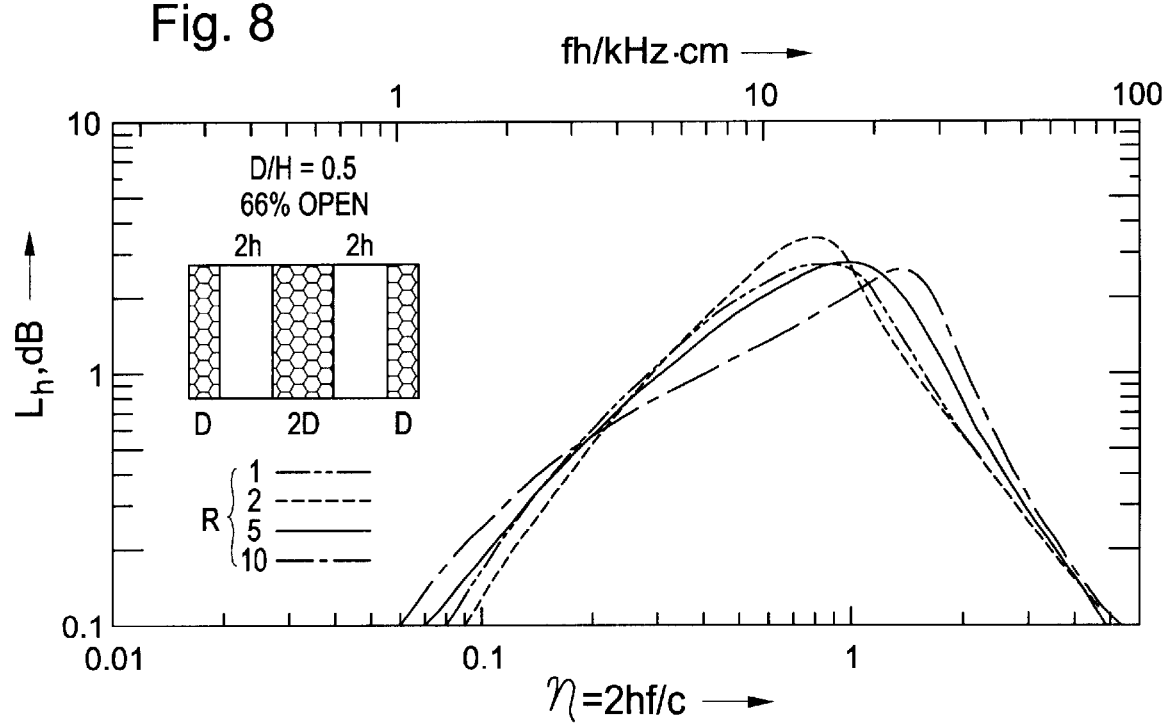
FIG. 8 is a graph used for designing various silencer dimensions, assuming the silencer has a 66% open configuration.

More precise figures for H, D, and L may also be calculated if greater silencing performance is needed. FIG. 7 and FIG. 8 are derived from a numerical model and can be useful for determining the gap dimension H and the baffle length L for a given silencer 500 configuration. FIG. 7 assumes a 50% open baffle configuration, and FIG. 8 assumes a 66% open baffle configuration. The 50% open configuration, where H≈D, encourages more reflections than the 66% open configuration and therefore provides more effective noise reduction, allowing for a comparatively shorter baffle length L to accomplish the same overall noise attenuation. This configuration may be preferable where space is limited, but an increase in noise reduction performance typically results in higher pressure drop across the silencer 500. The 66% open configuration may be preferable, therefore, where space is not critical, but limiting pressure drop through the silencer 500 is important.

Referring now to FIG. 7, it is useful to define several parameters that will help determine the gap dimension H and the baffle length L. The graph shown in FIG. 7 includes a quantity $\eta$ along the lower X-axis, defined as:

$$\eta=(2\times h\times f)/c=H/\lambda$$

where 2h=H=gap, f=design frequency of 130 kHz, and c=speed of sound in natural gas of typically 400 meters per second. The upper X-axis provides f×h for atmospheric air with a speed of sound of 330 meters per second; therefore only the lower X-axis is applicable when designing a natural gas silencer. Along the Y-axis of FIG. 7 is a quantity $L_h$ (dB), which is an incremental attenuation loss based on the silencer geometry, frequency, and normalized flow resistance R of the baffles 520, 530, 540. The normalized flow resistance R is defined as:

$$R=(R1\times D)/(\rho\times c)$$

Where R1=flow resistance of the baffle material

The plot in FIG. 7 provides $L_h$ as a function of $\eta$ for several different R values, assuming a 50% open configuration. Based on these plots, $\eta$=1.5 provides a reasonable performance over a range of c and f, giving H=($\eta\times c/f$)= (1.5*400 meters per second/130 KHz)=4.6 mm from the equation above, and $L_h\approx 0.70$ decibels (dB) reading from the graph.

Then the total length L of the baffles can be determined based on the following formula for $L_L$, the total attenuation loss across the silencer 500:

$$L_L=L_h\times L/H$$

To determine the baffle length L, the total attenuation loss $L_L$ required for the particular installation is input as a known quantity into the equation, and the values for $L_h$ and H are also known, so L can be calculated. For example, assuming the total attenuation loss $L_L$ required for a particular installation is 40 dB, the above calculation yields a baffle length L≈($L_L\times H/L_h$)=(40 dB×4.6 mm/0.7 dB)=0.26 meters. Therefore, the silencer 500 will require baffles having a length L=0.26 meters to achieve a 40 dB ultrasonic noise reduction for a 50% open configuration where H=4.6 mm.

Using FIG. 8 and following the same procedure yields H, $L_h$ and L for a 66% open configuration. For this configuration, $\eta$=2 will provide a reasonable performance, yielding H=6 mm and L≈0.60 meters.

To determine the baffle width D, recall that the gap H should normally be greater than the width D to prevent the silencer 500 from generating self-noise. Recall also that FIG. 7 and FIG. 8 assume configurations that are 50% open and 66% open respectively, giving some guidance as to the dimension of width D relative to the gap H. Retimet® grade 45 is commercially available in 2 mm, 4 mm, 7 mm and 13 mm widths. Preferably, for a configuration where H=4.6 mm or H=6 mm, width D is selected such that D=4 mm for ease of construction.

Pressure drop across the silencer is another consideration that could impact the selection of the width D, gap H, length L, and diameter T. The total pressure drop $\Delta P_T$ through the silencer 500 is provided as follows:

$$\Delta P_T=\tfrac{1}{2}\times\rho\times V^2\times(K_{ENTRANCE}+K_{EXIT}+K_{FRICTION})$$

Where
  $\rho$=density of the natural gas (assumed 50 kg/m$^3$ for calculation)
  V=face velocity along the passage (assumed 40 m/s for calculation, corresponding to M=0.1)
  $K_{ENTRANCE}$, $K_{EXIT}$, $K_{FRICTION}$=entrance, exit and friction losses Further, the pressure losses K are defined by:

$$K_{ENTRANCE}\approx 0.5/(1+H/D)$$

$$K_{EXIT}\approx 1.5\times(/[1+H/D])^2$$

$$K_{FRICTION}\approx 0.020\times(L/H)$$

Inputting the values for H, D and L will yield the losses, and then the total pressure loss $\Delta P_T$ through the silencer 500 can be calculated. Given the example where H=4.6 mm, D=4 mm, T=151 mm, and L=0.26 meters, the pressure loss $\Delta P_T$=0.68 bar. Where H=6 mm, D=4 mm, T=171 mm, and L=0.60 meters, the pressure loss $\Delta P_T$=0.46 bar.

Figure 9:
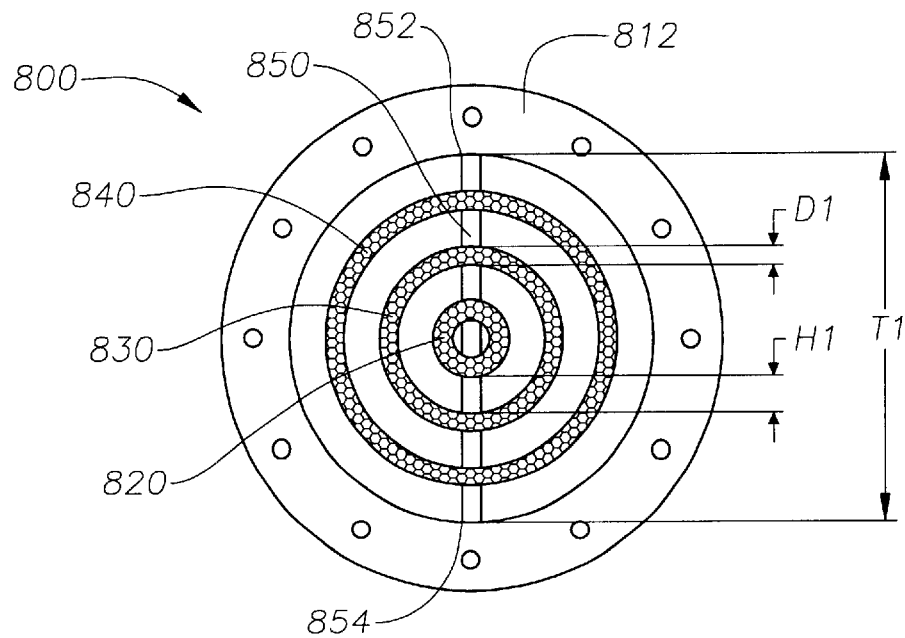
FIG. 9 is an end view of a silencer according to another embodiment of the present invention, incorporating a plurality of concentric, cylindrical partitioning members or baffles having open spaces or passageways therebetween.
Figure 10:
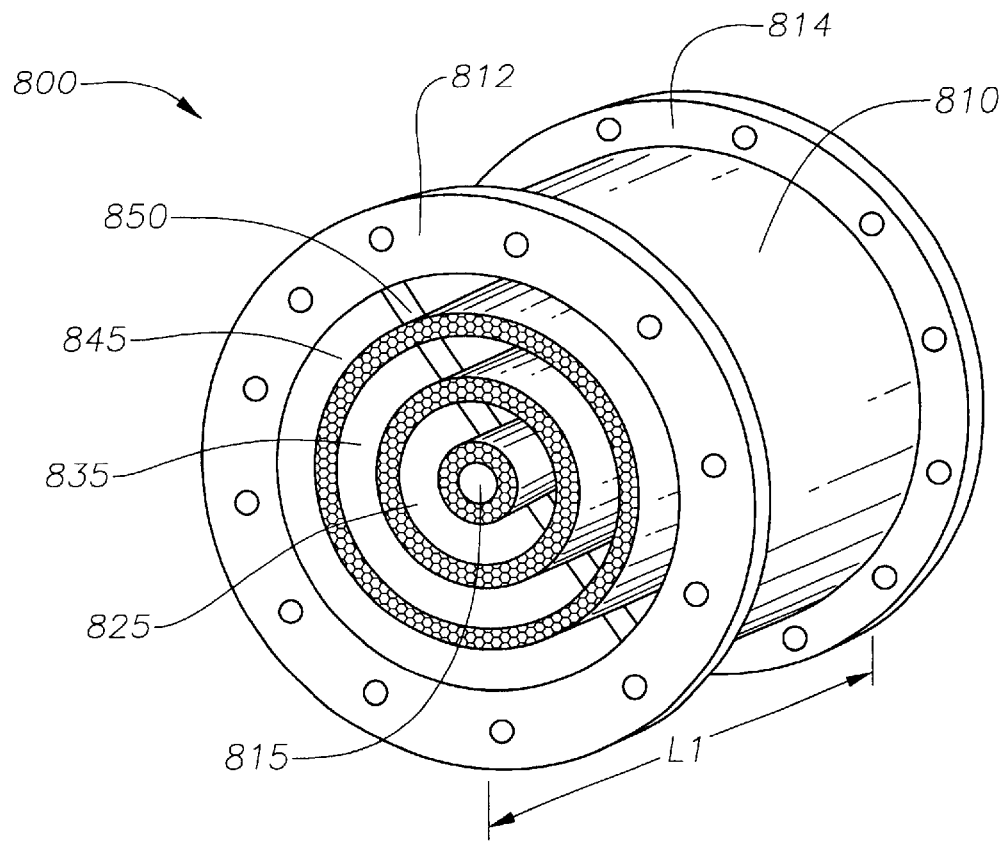
FIG. 10 is a perspective view of the silencer illustrated in FIG. 9.

FIG. 9 and FIG. 10 depict another embodiment of the silencer 800 of the present invention. FIG. 9 is a representative end view of the silencer 800, and FIG. 10 is a perspective view of the silencer 800 of FIG. 9. The silencer 800 includes a tubular body 810, a plurality of concentric, cylindrical baffles 820, 830, 840 having flow spaces or passageways 815, 825, 835, 845 therebetween, and at least one support fixture 850.

The tubular body 810 has a diameter T1 that typically matches the diameter of the pipe section within which the silencer 800 is disposed. The tubular body 810 may have flanged ends 812, 814 for a bolted connection to flanges mounted on the pipe section, or the ends 812, 814 may have any other suitable configuration for connecting to the pipe.

The silencer 800 includes at least two, and more commonly a plurality of baffles, such as three baffle; 820, 830, 840 as depicted in FIGS. 9 and 10. Like the embodiment depicted in FIG. 5 and FIG. 6, the baffles 820, 830, 840 are formed of an open-cell material that is preferably a reticulated metal foam material, and more preferably Retimet® metal foam. The baffles 820, 830, 840 each have a comparable wall thickness D1 and a comparable length L1, and they are spaced apart by flow spaces 815, 825, 835, 845 through which the gas flows between the baffles 820, 830, 840. The flow spaces 815, 825, 835, 845 are generally the same size, each having a gap dimension H1.

At least one support fixture 850 is provided to maintain the position of the baffles 820, 830, 840 within tubular body 810. A single support fixture 850 may pass radially at any angle through the tubular body 810 and baffles 820, 830, 840, such as top-to-bottom through the centerline as shown in FIG. 9. Alternatively, more than one support fixture 850 may be provided. The support fixtures 850 connect, such as by threads or by welding, to the tubular body 810 at 852, 854.

To design the silencer 800, the operating considerations and calculations used to design the silencer 500 of FIGS. 5 and 6 would also apply to the silencer 800 of FIGS. 9 and 10. The two-dimensional $L_h$ curves provided in FIG. 7 and FIG. 8 can be applied to the axi-symmetric silencer 800 configuration. Thus, the same procedure would be followed to determine the silencer 800 baffle wall thickness D1, the gap H1, and the baffle length L1 depicted in FIGS. 9 and 10.

Figure 11:
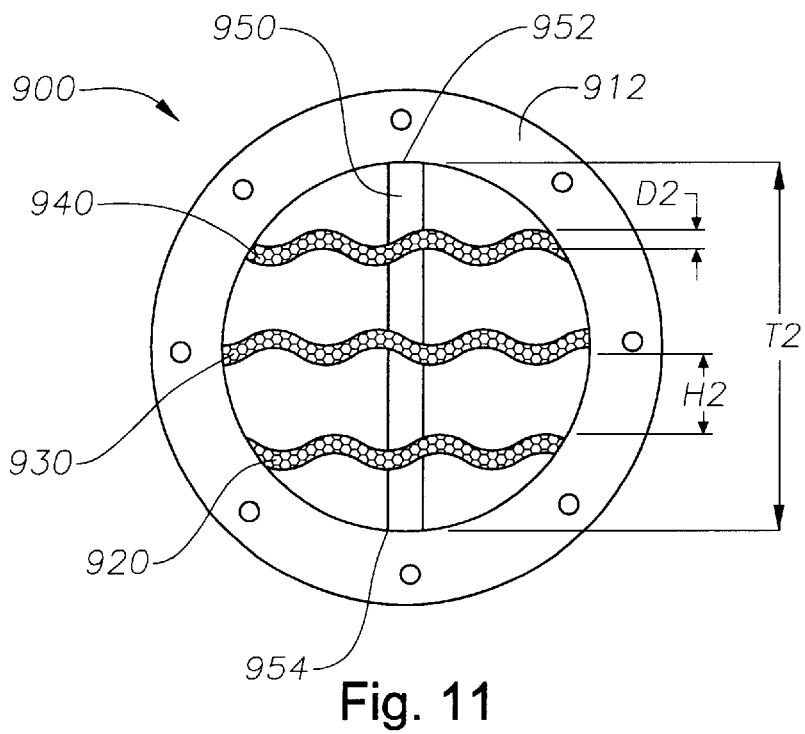
FIG. 11 is an end view of a silencer according to yet another embodiment of the present invention incorporating a plurality of parallel, corrugated plate baffles having open spaces or passageways therebetween.
Figure 12:
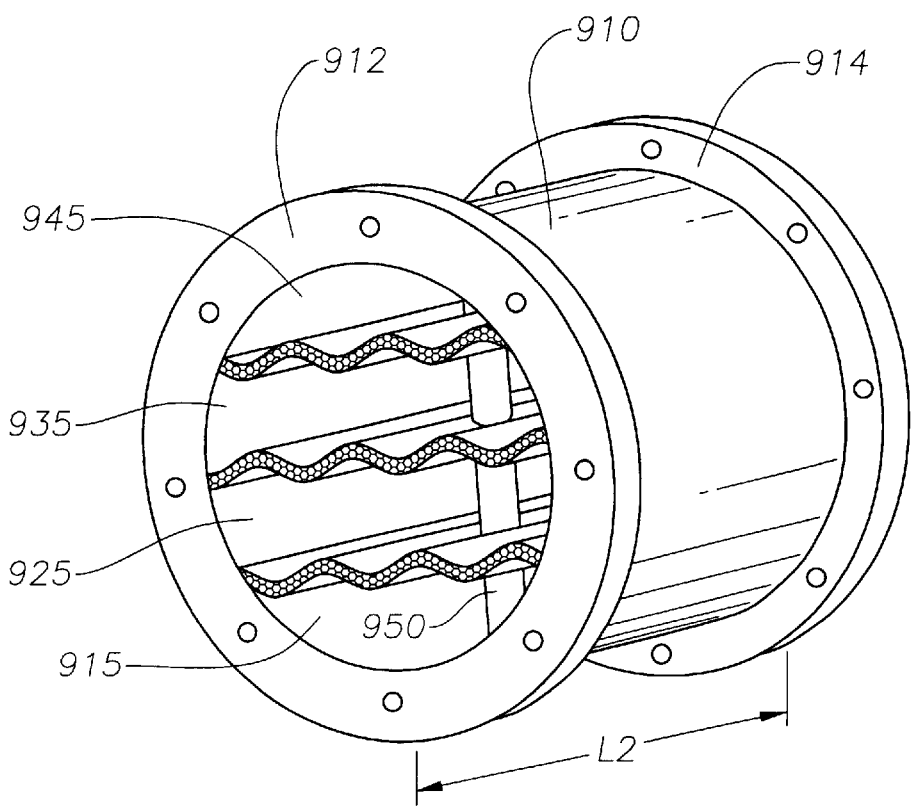
FIG. 12 is a perspective view of the silencer illustrated in FIG. 11.

FIG. 11 and FIG. 12 depict yet another embodiment of the silencer 900 of the present invention. FIG. 11 is a representative end view of the silencer 900, and FIG. 12 is a perspective view of the silencer 900 of FIG. 11. The silencer 900 includes a tubular body 910, a plurality of corrugated, plate baffles 920, 930, 940 having flow spaces or passageways 915, 925, 935, 945 therebetween, and at least one support fixture 950.

The tubular body 910 has a diameter T2 that typically matches the diameter of the pipe section within which the silencer 900 is disposed. The tubular body 910 has ends 912, 914 that may be flanged or ends 912, 914 may have any other suitable configuration for connecting to the pipe.

The silencer 900 includes at least two, and more commonly a plurality of baffles, such as three baffles 920, 930, 940 as depicted in FIGS. 11 and 12, and the baffles 920, 930, 940 are preferably formed of Retimet® metal foam. The baffles 920, 930, 940 each have approximately the same width D2 and length L2, and they are spaced apart by flow spaces 915, 925, 935, 945 through which the gas flow passes between the baffles 920, 930, 940. The flow spaces 915, 925, 935, 945 are generally the same size, each having a gap dimension H2. At least one support fixture 950 is provided and connects to the tubular body 910 at 952, 954.

Again, the operating considerations and the calculations used to design the silencer 500 of FIGS. 5 and 6 also apply to the silencer 900 of FIGS. 11 and 12. The $L_h$ curves of FIG. 7 and FIG. 8 can be applied to the silencer 900 configuration. Thus, the same procedure would be followed to determine the silencer 900 baffle wall thickness D2, the gap H2, and the baffle length L2 depicted in FIGS. 11 and 12.

In summary, regardless of the embodiment, the silencer performance for a specific measurement application is defined by the grade of material that forms the baffles, the diameter of the tubular body, the width and length dimensions of the baffles, and the gap between baffles. These parameters are determined based on a compromise between: 1) achieving the desired reduction in ultrasonic noise level, 2) limiting the pressure drop through the silencer to acceptable levels, 3) achieving the lengthwise spacing requirements of the particular installation, and 4) ensuring the gas flow through the silencer remains below about a tenth of the sonic velocity to prevent the silencer from generating self-noise in the acoustic range of frequencies.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A silencer comprising:
   a tubular body having a diameter and a body length; and
   at least two baffles disposed internally of said tubular body, said baffles each having a width and a baffle length substantially equal to said body length and being spaced apart one from another by a gap;
   wherein said baffles reduce noise in the ultrasonic range of frequencies.

2. The silencer of claim 1 wherein said baffles are formed of an open-cell material.

3. The silencer of claim 2 wherein said open-cell material is reticulated metal foam.

4. A silencer for reducing ultrasonic noise comprising:
   a tubular body having a diameter; and
   at least two baffles disposed internally of said tubular body, said baffles each having a width and a length and being spaced apart one from another by a gap;
   wherein said baffles are formed of an open-cell material that includes a plurality of pores with diameters significantly smaller than one wavelength of said ultrasonic noise.

5. A silencer for reducing ultrasonic noise comprising:
   a tubular body having a diameter; and
   at least two baffles disposed internally of said tubular body, said baffles each having a width and a length and being spaced apart one from another by a gap;
   wherein said width is approximately equal to one wavelength of said ultrasonic noise.

6. A silencer for reducing ultrasonic noise comprising:

a tubular body having a diameter; and at least two baffles disposed internally of said tubular body, said baffles each having a width and a length and being spaced apart one from another by a gap;

wherein said gap is greater than one wavelength of said ultrasonic-noise.

7. The silencer of claim 1 further comprising at least one support member for supporting said baffles within said tubular member.

8. The silencer of claim 7 wherein said support member maintains said gap.

9. The silencer of claim 1 wherein said silencer is a flow conditioner.

10. The silencer of claim 1 wherein said width is disposed perpendicular to the direction of flow and said baffle length is disposed parallel to the direction of flow.

11. The silencer of claim 1 wherein said baffles are parallel, flat plates.

12. The silencer of claim 1 wherein said baffles are concentric tubular members.

13. The silencer of claim 1 wherein said baffles are parallel, corrugated plates.

14. The silencer of claim 1 wherein for a given width and gap, said baffle length governs said level of noise reduction.

15. A silencer for reducing ultrasonic noise comprising:

a tubular body having a diameter; and at least two baffles disposed internally of said tubular body, said baffles each having a width and a length and being spaced apart one from another by a gap;

wherein said length is approximately 100 to 200 times one wavelength of said ultrasonic noise.

16. The silencer of claim 1 wherein said gap is greater than said width.

17. A silencer comprising:

a tubular body having a diameter; and at least two baffles disposed internally of said tubular body, said baffles each having a width and a length and being spaced apart one from another by a gap;

wherein the Mach number of a flow through said silencer is less than 0.1.

18. The silencer of claim 1 wherein a pressure loss through the silencer is determined from said baffle length, said width, said gap, and said diameter.

19. The silencer of claim 1 wherein said silencer is capable of reducing noise under high operating pressure conditions.

20. A system comprising:

an ultrasonic meter having a meter diameter, a source of ultrasonic noise, and a silencer connected between said meter and said source for reducing a level of said ultrasonic noise, said silencer having a silencer diameter and a silencer length and including at least two baffles having a width and a baffle length substantially equal to said silencer length and being spaced apart one from another by a gap.

21. The system of claim 20 wherein said silencer diameter is approximately equal to said meter diameter.

22. The system of claim 20 wherein said silencer diameter is larger than said meter diameter.

23. The system of claim 20 wherein said silencer is connected adjacent said meter or adjacent said source.

24. The system of claim 20 wherein said silencer may be connected either upstream or downstream of said meter.

25. The system of claim 20 wherein said source and said meter are linearly disposed with respect to one another.

26. The system of claim 20 wherein said source and said meter are separated by an angle.

27. The system of claim 26 wherein said silencer and said source are linearly disposed with respect to one another.

28. A method of attenuating a noise in the ultrasonic range of frequencies comprising:

flowing a plurality of ultrasonic noise waves through a silencer having at least two baffles formed of reticulated metal foam material;

partially reflecting the waves between the baffles; and the baffles absorbing noise energy with each reflection.

29. The method of claim 28 wherein the baffles are capable of absorbing noise energy under high pressure operating conditions.

30. The method of claim 28 wherein said baffles absorb noise energy by friction.

31. A method of designing a silencer having a diameter and at least two baffles internally disposed therein comprising:

iteratively dimensioning the diameter, a length and a width of the baffles, and a gap between baffles such that the silencer substantially meets a set of requirements comprising:

reducing a defined level of ultrasonic noise;

creating a lower pressure drop than a defined maximum;

having a shorter length than a defined maximum, and having an open flow area that prevents the silencer from generating noise.

* * * * *